United States Patent
Liu

(10) Patent No.: US 7,385,975 B2
(45) Date of Patent: Jun. 10, 2008

(54) ROUTING METHOD AND SIP SERVER USING THE SAME

(75) Inventor: Chung-Fan Liu, Tainan (TW)

(73) Assignee: Institute for Information Industry, Taipei (TW)

( * ) Notice: Subject to any disclaimer, the term of this patent is extended or adjusted under 35 U.S.C. 154(b) by 751 days.

(21) Appl. No.: 10/847,128

(22) Filed: May 17, 2004

(65) Prior Publication Data

US 2005/0100001 A1 May 12, 2005

(30) Foreign Application Priority Data

Nov. 12, 2003 (TW) .............................. 92134994 A

(51) Int. Cl.
*H04L 12/56* (2006.01)
(52) U.S. Cl. ..................... 370/389; 370/230; 370/401; 370/475
(58) Field of Classification Search ................ 370/230, 370/352, 389, 392, 401, 466, 475
See application file for complete search history.

(56) References Cited

U.S. PATENT DOCUMENTS 6,731,642 B1* 5/2004 Borella et al. .............. 370/401
2002/0114322 A1* 8/2002 Xu et al. ..................... 370/352
2004/0037268 A1* 2/2004 Read ........................... 370/352
2004/0047340 A1* 3/2004 Ruckstuhl et al. .......... 370/352
2004/0264439 A1* 12/2004 Doherty et al. ............. 370/352
2004/0264449 A1* 12/2004 Klaghofer et al. .......... 370/389
2005/0125532 A1* 6/2005 Kimchi ....................... 709/225

* cited by examiner

*Primary Examiner*—Firmin Backer
*Assistant Examiner*—Nguyen Ngo
(74) *Attorney, Agent, or Firm*—Thomas, Kayden, Horstemeyer & Risley

(57) ABSTRACT

A routing method. When implemented in a network system, the routing method ameliorates problems of media stream routing through a network address translation (NAT) device. First, whether a first terminal will correspond to different public address-and-port information for receiving media stream packets from a second terminal opposite to the first terminal after receiving different requests is determined. The first and second terminals comprise a caller and a callee which are capable of communicating in SIP protocol. The public address-and-port information is recorded as source information in media stream packets initiated by the requests. Media stream packets from the first terminal are relayed based on the determination.

7 Claims, 4 Drawing Sheets

ROUTING METHOD AND SIP SERVER USING THE SAME

BACKGROUND OF THE INVENTION

1. Field of the Invention

The present invention relates to a session initiation protocol (SIP), and in particular to a routing method which may conform to standard SIP specification, wherein real-time transport protocol (RTP) packets can pass through network address translation (NAT) devices and be routed correctly.

2. Description of the Related Art

A private address and a port number of a network device in a local area network (LAN) with a network address translation (NAT) device are translated to a public address and a public port number by the NAT device when communicating with another network device external to the LAN. In standard session initiation protocol (SIP), a session description protocol (SDP) message record an actual address and a port number, i.e. a private address and a port number, of a source communication terminal transmitting the SDP messages. On the other hand, when receiving the SDP message, another communication terminal opposite the communication terminal transmits real-time transport protocol (RTP) packets based on the source address and port number recorded in the received SDP message. Hence, if the source address and port number recorded in the SDP messages are a private address and private port number, the RTP packets will be incorrectly routed.

Several methods have been adopted to solve the above-mentioned problem of RTP packet routing. For example, in one method, a SIP server which can be referred to in document RFC 2543 or RFC 3261, published by the Internet Engineering Task Force (IETF), relays all RTP packets of a caller and a callee to ensure correct RTP packet routing. This method, however, places a heavy relay work load on the SIP server.

In method of Application Level Gateway (ALG) and Firewall Control Protocol (FCP) methods, NAT devices translate private source addresses and port numbers of outgoing SDP messages transmitted from an internal to an external network into public addresses and port numbers. NAT devices conforming to ALG and FCP, however, are required by the method while other NAT devices do not work.

In the Simple Traversal of UDP through NATs (STUN) or Traversal Using Relay NAT (TURN) methods, a NAT device is provided with a server for notifying internal terminals of public addresses and port numbers correspond thereto. An internal terminal acquires a public address and port number, from the server of a NAT device, as source address and port number in an SDP message. This method, however, requires additional servers, and communication terminals are required to support the STUN or TURN protocol. Additionally, there is a still high probability that RTP packets will be relayed by a SIP server. Hence, SIP servers are still placed with a heavy relay work load.

In the universal plug and play (UPnP) method, communication terminals acquire public addresses and port numbers from NAT devices, as source addresses and port numbers recorded in SDP messages. Terminals and NAT devices, however, must support the UPnP protocol in addition to SIP.

In still another method, the NAT device type is detected using standard SIP messages to overcome the previously described problem of RTP packet routing. In the method, NAT devices are categorized into full cone, restricted cone, port restricted cone or symmetric NAT devices. This method, however, cannot work correctly with other NAT devices excluded from the four NAT device categories.

In summary, additional resources are required in the above-described methods, such as NAT devices supporting ALG, and NAT devices provided with additional servers or additional protocols. Alternatively, NAT devices are required to satisfy four NAT device categories. Hence, the conventional methods are only capable of working effectively with SIP systems with the provision of additional resources and typical NAT devices.

Hence, there is a need for a new method capable of solving the problems presented by the conventional methods.

SUMMARY OF THE INVENTION

Accordingly, an object of the invention is to provide a routing method capable of solving the problems presented by the conventional methods.

In order to achieve the above objects, the invention provides a routing method which may be implemented in a session initiation protocol (SIP) server. First, whether a first terminal will correspond to different public addresses and public port numbers for receiving media stream packets from a second terminal opposite to the first terminal after receiving different requests is determined. The first and second terminals comprise a caller and a callee which are capable of communicating in SIP protocol. The public addresses and the public port numbers are recorded as source information in media stream packets initiated by the requests. Media stream packets from the first terminal are relayed based on the determination.

In addition, the routing method of the invention can be implemented with a computer application recorded in a storage medium such as a memory or a memory device, when loaded into a computer, direct the computer to execute the routing method of the invention.

Another objective of the invention is to provide a session initiation protocol (SIP) server comprising a communication unit and a processing unit. The communication unit receives and transmits packets from a first and a second terminal comprising a caller and a callee which are capable of communicating in SIP protocol. The processing unit coupling to the communication unit determines whether the first terminal will correspond to different public addresses and public port numbers for receiving media stream packets from a second terminal opposite to the first terminal after receiving different requests. The public addresses and port numbers is recorded as source information in media stream packets initiated by the requests. The communication unit relays media stream packets from the first terminal based on the determination.

DESCRIPTION OF THE DRAWINGS

The present invention can be more fully understood by reading the subsequent detailed description and examples with references made to the accompanying drawings, wherein.

DETAILED DESCRIPTION OF THE INVENTION

The invention provides a routing method for ameliorating the problem of media streams such as RTP packets passing through NAT devices, wherein the method may conform to SIP protocol and may be implemented in a network regardless of NAT device type.

The routing method of the invention can be implemented in a relay server or a proxy server. A relay server and a proxy server can be combined into one server or can be two individual servers. In the embodiment, a SIP server comprises a relay server and a proxy server. It is noted that the arrangement is not intended to limit the invention. A SIP server may comprise a relay server, a proxy server or the combination thereof.

Figure 1:
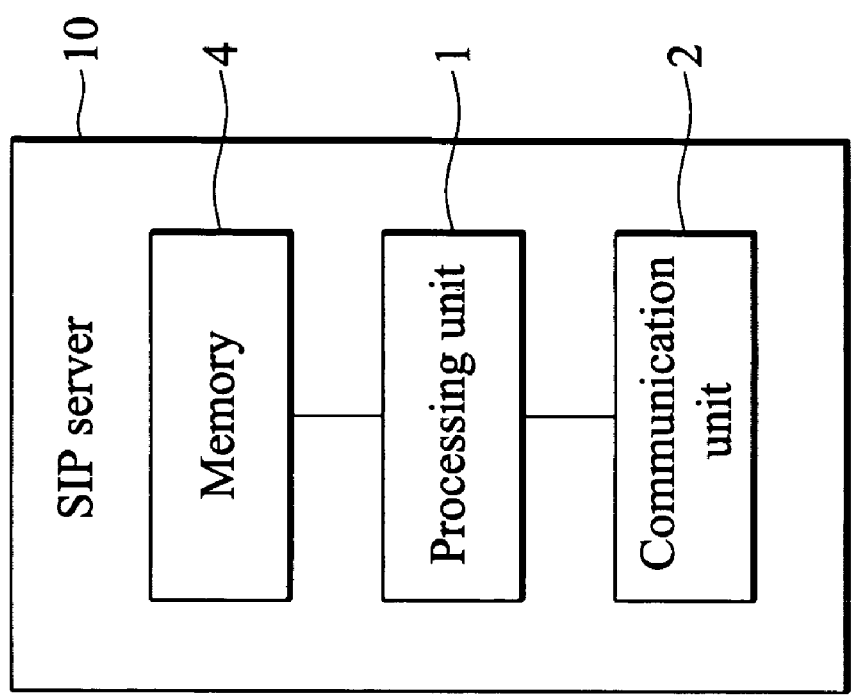
FIG. 1 is a block diagram of the configuration of a SIP server according to the preferred embodiment of the invention.

FIG. 1 is a block diagram of the configuration of a SIP server according to the preferred embodiment of the invention. SIP server 10 comprises processing unit 1, communication unit 2 and memory 4. Processing unit 1 couples communication unit 2 and memory 4. Communication unit 2 transmits and receives packets. Memory 4 stores data. Processing unit 1 controls communication unit 2 and memory 4 and performs data and logic processing.

Figure 2:
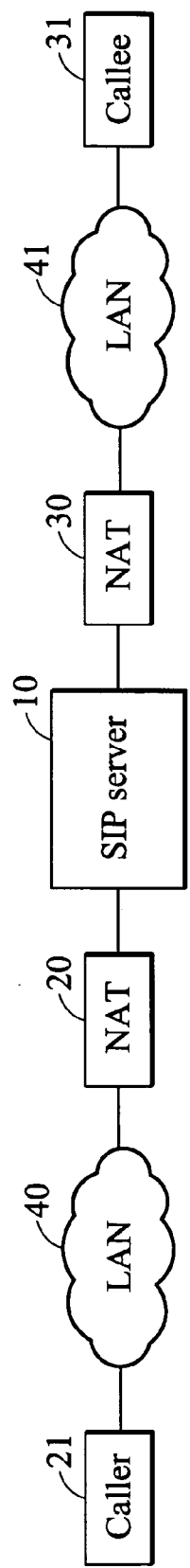
FIG. 2 is a schematic diagram of the configuration of a SIP network system according to the preferred embodiment of the invention.

FIG. 2 is a schematic diagram of the configuration of a SIP network system according to the preferred embodiment of the invention. SIP server 10 connects to LANs 40 and 41 through NAT devices 20 and 30 respectively. LAN 40 comprises a terminal, caller 21, and LAN 41 contains another terminal, callee 31.

Practically, some terminals change port numbers for a session after accepting different session initiation requests. A communication terminal located in a private local area network and provided with a virtual network address is hereafter referred as a virtual terminal. When one terminal of this kind is provided with a private network address and a private port number and located in a virtual LAN, at least a public address or port number corresponding to the virtual terminal and session established thereby may differ after the virtual terminal has accepted different session initiation requests, wherein the public address and port number are generated by NAT devices of the virtual LAN and are recorded in outgoing packets transmitted by the virtual terminal as source address information. In addition, some NAT devices map the same private network address and port number to different public network address and port number under different conditions. Hence, any change of the correlation between a virtual terminal, session established thereby, the public network addresses and public port numbers corresponding thereto may be caused by terminals or NAT devices.

The method of the invention for routing RTP packets passing through NAT devices is implemented in a SIP server regardless of whether the changes of corresponding public network address and port number of a session of a terminal are caused by terminals or NAT devices. First, processing unit 1 determines whether the a first terminal will correspond to different public addresses and port numbers for receiving media stream packets from a second terminal opposite to the first terminal after receiving different requests. The first and second terminal comprising a caller and a callee which are capable of communicating in SIP protocol. The public addresses and port number are recorded as source information in media stream packets initiated by the requests. By the determination, the behavior of a terminal or a combination comprising a virtual terminal and a NAT device after different requests are received thereby can be detected. The media stream packets comprising RTP and real time control protocol (RTCP) packets from the terminal are determined to be relayed or not based on the determination, i.e. the communication unit 2 relays media stream packets from the first terminal based on the determination.

Figure 3:
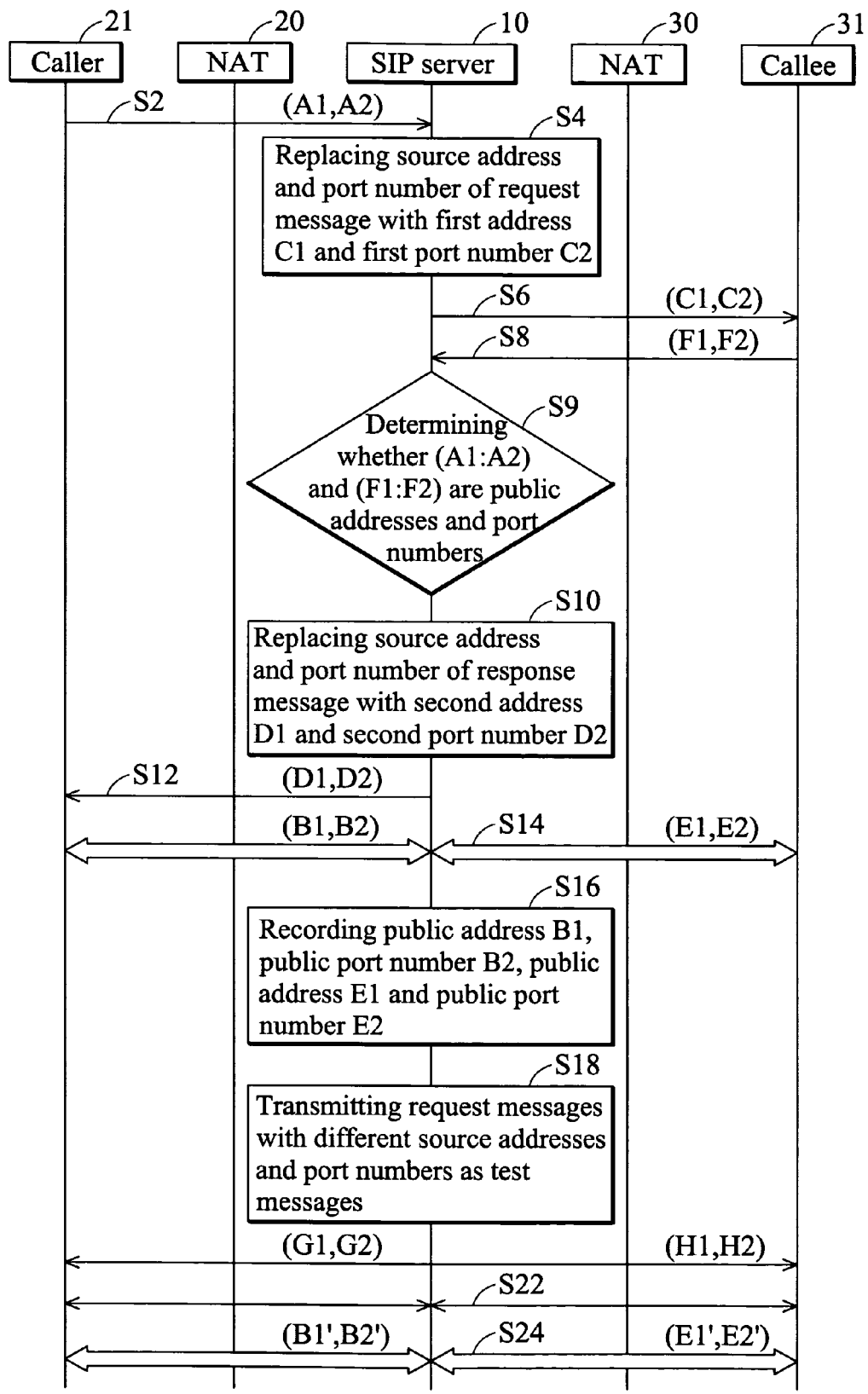
FIG. 3 and FIG. 4 are flow charts of the routing method for RTP packets passing through NAT devices according to the preferred embodiment of the invention.
Figure 4:
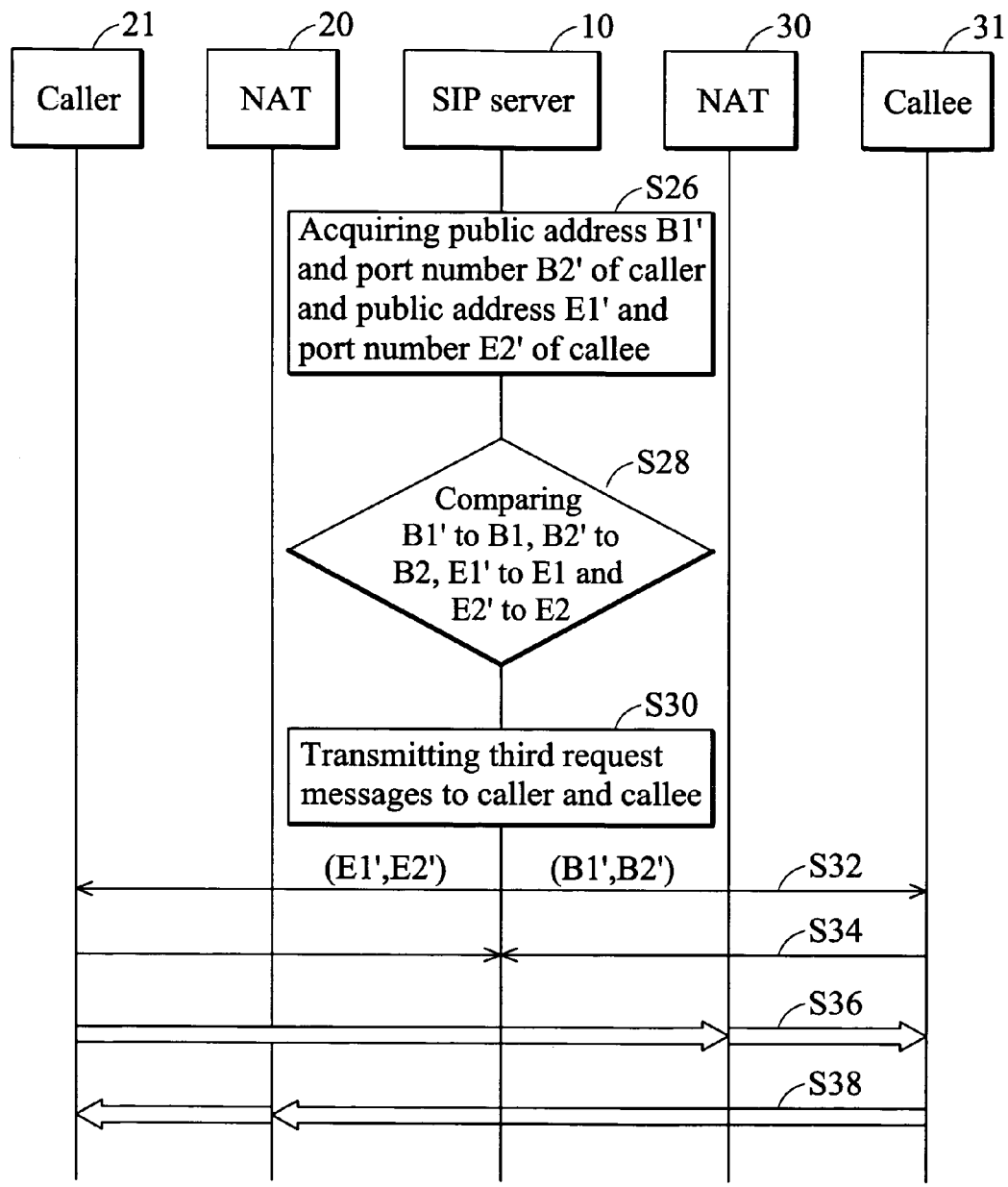

FIG. 3 and FIG. 4 are flow charts of the method for routing RTP packets through NAT devices according to the preferred embodiment of the invention. When caller 21 invites callee 31 to initiate a session, first, caller 21 transmits a session initiation request to SIP server 10, the source network address and port number of which are A1 and A2 (step S2). When SIP server 10 receives the session initiation request through communication unit 2, processing unit 1 replaces the source network address and port number of the session initiation request by a first public address C1 and a first public port number C2 assigned to SIP server 10, such that callee 31, after receiving the amended request message can transmit media streams to SIP server 10 based on the first public address C1 and first public port number C2. Next, processing unit 1 transmits the request message with the substitutive source address-and-port pair (C1:C2) to callee 31 through communication unit 2 (step S6).

Callee 31 transmits a response message to SIP server 10, such as SIP/2.0 200 OK, corresponding to the amended session initiation request, comprising source network address and port number F1 and F2 (step S8). After SIP server 10 receives the response message through communication unit 2, processing unit 1 determines whether the address-and-port pairs (A1:A2) and (F1:F2) are public addresses and public port numbers (step S9). If both (A1:A2) and (F1:F2) are public addresses and public port numbers, SIP server 10 transmits a session initiation request with source address A1 and source port number A2 to callee 31 (not shown) and another session initiation request with source address F1 and source port number F2 to caller 21 (not shown).

If (A1:A2) or (F1:F2) are not public address and public port numbers, processing unit 1 of SIP server 10 replaces the source address and source port number of the response message with a second address D1 and a second port number D2 designated to SIP server 10 (step S10), such that caller 21 can transmit, after receiving the amended response message, a media stream to SIP server 10 based on the second public address D1 and second public port number D2. Next, processing unit 1 of SIP server 10 transmits the response message with the substitutive source address-and-port pair (D1:D2) to caller 21 (step S12).

Caller 21 and Callee 31 deliver RTP packets for media stream transmission. NAT device 20 generates and records a public address B1 and a public port number B2 in headers of outgoing RTP packets from caller 21. Similarly, NAT device 30 generates and records a public address E1 and a public port number E2 in headers of outgoing RTP packets from callee 31. RTP packets are transmitted respectively from caller 21 and callee 31 to SIP server 10 (step S14).

After communication unit 2 receives RTP packets from caller 21 and callee 31, processing unit 1 of SIP server 10 extracts public source address-and-port pairs (B1:B2) of caller 21 and (E1:E2) of callee 31 from headers of RTP packets transmitted by caller 21 and callee 31 respectively. In SIP server 10, processing unit 1 records public address B1, public port number B2, public address E1 and public port number E2 in memory 4 (step S16). Through communication unit 2, processing unit 1 relays RTP packets from caller 21 to callee 31 and RTP packets from callee 31 to caller 21.

SIP server 10 transmits test messages to determine whether public source addresses and public port numbers of caller 21 and callee 31 recorded respectively in RTP packets from caller 21 and callee 31 will change when caller 21 and callee 31 receive different session initiating requests. In the embodiment, SIP server 10, through communication unit 2, transmits a session initiation request, as a test message, with a third public source address G1 and a third public source port number G2 to caller 21 and another session initiation request, as another test message, with a fourth public source address H1 and a fourth public source port number H2 to callee 31 (step S18). Caller 21 and callee 31 transmit response messages of the test messages respectively to SIP server 10 (step S22).

The third public address G1, third public port number G2, fourth public address H1 and fourth public port number H2 have been assigned to SIP server 10, by which caller 21 and callee 31 can transmit media streams to SIP server 10 respectively. In the embodiment, first address-and-port pair (C1:C2) differs from third address-and-port pair (G1:G2), and second address-and-port pair (D1:D2) differs from second address-and-port pair (H1:H2). Because SIP server 10 may comprise a plurality of servers, such as a proxy server and a relay server, each first address C1, second address D1, third address G1 and fourth address H1 may be the addresses respectively designated to the composing servers and may be different from one another. The first address C1 may be the same as third address G1. In this case, first port number C2 must be different from third port number G2. Similarly, if second address D1 is the same with fourth address H1, second port number D2 must be different from fourth port number H2.

After receiving the test messages respectively, caller 21 and callee 31 transmit RTP packets to SIP server 10 based on source addresses and port numbers of the test messages respectively (step S24). When SIP server 10 receives the RTP packets from caller 21 and callee 31, processing unit 1 extracts public source address B1' and public source port number B2' of caller 21 from RTP packets transmitted by caller 21 and public source address E1' and public source port number E2' of callee 31 from RTP packets transmitted by callee 31 (step S26). Processing unit 1 compares public address B1' to B1, public port number B2' to B2, public address E1' to E1 and public port number E2' to E2 (step S28).

If public address B1' is equals to B1, public port number B2' is equal to B2, public address E1' is equal to E1 and public port number E2' is equal to E2, i.e. (B1':B2') is equal to (B1:B2) and (E1':E2') is equal to (E1:E2), processing unit 1 determines that each caller 21 and callee 31 does not correspond to different public address-and-port pairs after being re-invited with different requests. In the embodiment, if a terminal or a combination of a virtual terminal and a NAT device act in this way, the terminal or the combination of the virtual terminal and the NAT device are categorized as relay-free class. Hence, processing unit 1 of SIP server 10 transmits, through communication unit 2, a third session initiation request with public source address-and-port pair (B1':B2') or (B1:B2) to callee 31 and another third session initiation request with public source address-and-port pair (E1':E2') or (E1:E2) to caller 21 (step S30). After caller 21 and callee 31 transmit response messages to the third requests to SIP server 10 (step S34), caller 21 and callee 31 can directly transmit media streams comprising RTP and RTCP packets to each other based on the public address and port number of their opposite terminal without relay by SIP server 10.

If B1' differs from B1, B2' differs from B2, E1' differs from E1 or E2' differs from E2, processing unit 1 determines that at least caller 21 or callee 31 has different public address or public port numbers corresponding thereto after being re-invited by different requests. In the embodiment, if a terminal or a combination of a virtual terminal and a NAT device fulfills this determined condition, the terminal and the combination are categorized to a relay-needed class. Hence, SIP server 10 continues relaying RTP and RTCP packets between caller 21 and callee 31.

In the embodiment, for example, if processing unit 1 determines that caller 21 and NAT device 20 belong to the relay-needed class, SIP server 10 at least relays RTP packets transmitted from caller 21. Similarly, if processing unit 1 determines that callee 31 and NAT device 30 belong to the relay-needed class, for example, SIP server 10 at least relays RTP packets transmitted from callee 31. If caller 21 and NAT device 20 and callee 31 and NAT device 30 all belong to relay-free class, SIP server can re-invite and acknowledge both caller 21 and callee 31 with the third requests to halt relay as described above.

In the embodiment, the purpose of transmitting test messages to caller 21 and callee 31 is to detect whether at least caller 21 and NAT device 20 or callee 31 and NAT device 30 belong to the relay-needed class. In other cases, however, a test message may be transmitted to only a caller 21 or a callee 31. For example, in a case wherein SIP server 10 is provided with a database for recording correlations of the two classes and the terminal-NAT combinations belonging thereto, SIP server 10 only transmits test messages to other terminals excluded from the database.

In the preferred embodiment of the invention, RTP packets are adopted to compare public source address-and-port pairs thereof in different invitations for a specific terminal and determine which class the terminal belongs to. This is not intended to limit the invention, other packets can be adopted for comparison as described above, such as RTCP packets or both SDP and RTP packets.

In addition, the routing method of the invention can be implemented with a computer application recorded in a storage medium such as a memory or a memory device, when loaded into a computer, direct the computer to execute the routing method of the invention.

In the preferred embodiment of the invention, SIP server 10, caller 21, callee 31, NAT devices 20 and 30 and communication between them may conform to standard SIP. The test messages and third session initiation requests may both conform to standard SIP. In a network system conforming to standard SIP, only SIP servers are required to execute the method of the invention to ameliorate the routing problem of media streams passing through NAT devices even though additional protocols, NAT devices or special servers are not introduced. As well, if any additional techniques or resources have been implemented in a network system, the method of the invention can be implemented in the network system without conflict.

Hence, the method of the invention ameliorates the problem of routing media streams through NAT devices regardless of the NAT device type.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A routing method, implemented in a session initiation protocol (SIP) server, comprising the steps of:
   receiving a signal from a second terminal, wherein the signal comprises a second media stream initiating request when the second terminal comprises a caller, and the signal comprises a fourth media stream initiating response when the second terminal comprises a callee;
   replacing a source address and port number in the signal with a first address and a first port number corresponding to the SIP server;
   transmitting the replaced signal to a first terminal;
   acquiring a public source address and a public source port number of a packet from the first terminal before transmitting a test signal, wherein the test signal comprises a third media stream initiating request with a second source address and a second source port number of the SIP server, which are different from the first address and the first port number of the SIP server;
   transmitting the test signal to test the first terminal;
   acquiring a public source address and a public source port number of another packet from the first terminal according to test results; and
   determining that the first terminal will correspond to different public addresses and public port numbers if the acquired public addresses and public port numbers differ before and after testing
   determining whether a first terminal will correspond to different public addresses and public port numbers for receiving media stream packets from a second terminal opposite to the first terminal after receiving different requests, wherein the first and second terminals comprise a caller and a callee which are capable of communicating in SIP protocol, and the public addresses and the public port numbers are recorded as source information in media stream packets initiated by the requests; and
   relaying media stream packets from the first terminal based on the determination.

2. The method as claimed in claim 1, further comprising the step of transmitting a first media stream initiating request to the first terminal when the first terminal is determined to correspond to the same public address and public port number, wherein the source address and source port number of the first media stream initiating request comprises a public address and a public port number corresponding to the second terminal and a port thereof used for receiving media stream packets from the first terminal.

3. The method as claimed in claim 1, wherein the media stream packets comprise real-time transport protocol (RTP) packets.

4. The method as claimed in claim 1, conforming to standard SIP protocol specification.

5. A session initiation protocol (SIP) server, comprising:
   a communication unit for receiving or transmitting packets from a first and a second terminals comprising a caller and a callee which are capable of communicating in SIP protocol and receives a signal from the second terminal, wherein the signal comprises a second media stream initiating request when the second terminal comprises the caller, or the signal comprises a media stream initiating response when the second terminal comprises the callee; and
   a processing unit coupling to the communication unit for replacing a source address and port number in the signal with a first address and a first a port number corresponding to the SIP server,
   wherein the communication unit transmits the replaced signal to the first terminal, the processing unit acquires a public source address and port number of a packet from the first terminal before transmitting a test signal, wherein the test signal comprises a third media stream initiating request with a second source address and port number of the SIP server, which are different from the first address and port number of the SIP server, the communication unit transmits a test signal to test the first terminal, the processing unit acquires a public source address and port number of another packet from the first terminal according to test results and determines that the first terminal will correspond to different public addresses and port numbers if the acquired public source addresses and port numbers differ before and after testing, and determines whether the first terminal will correspond to different public addresses and port numbers for receiving media stream packets from a second terminal opposite to the first terminal after receiving different requests, wherein the public addresses and the public port numbers are recorded as source information in media stream packets initiated by the requests, and the communication unit relays media stream packets from the first terminal based on the determination.

6. The SIP server as claimed in claim 5, wherein the communication unit transmits a first media stream initiating request to the first terminal when the first terminal is determined to correspond to the same public address and public port number, wherein the source address and port number of the first media stream initiating request comprises a public address and a public port number corresponding to the second terminal and a port thereof used for receiving media stream packets from the first terminal.

7. The SIP server as claimed in claim 5, wherein the media stream packets comprise real-time transport protocol (RTP) packets.

* * * * *